United States Patent [19]

Hesse et al.

[11] Patent Number: 4,670,485

[45] Date of Patent: Jun. 2, 1987

[54] HARDENABLE POLYESTER MOLDING MATERIALS

[75] Inventors: Anton Hesse, Weinheim; Hellmut Büensch, Norderstedt; Bernhard Czauderna, Hirschberg, all of Fed. Rep. of Germany

[73] Assignee: BASF Aktiengesellschaft, Fed. Rep. of Germany

[21] Appl. No.: 888,647

[22] Filed: Jul. 25, 1986

Related U.S. Application Data

[63] Continuation of Ser. No. 645,798, Aug. 30, 1984, abandoned.

[30] Foreign Application Priority Data

Sep. 6, 1983 [DE] Fed. Rep. of Germany ....... 3332019

[51] Int. Cl.$^4$ .................. C08L 67/06; C08L 63/10
[52] U.S. Cl. .................. 523/436; 523/522; 525/43; 525/64; 525/69; 525/187
[58] Field of Search .......... 523/436, 522; 525/43, 525/531, 69, 187

[56] References Cited

U.S. PATENT DOCUMENTS

| | | | |
|---|---|---|---|
| 3,660,371 | 5/1972 | Johnson | 525/69 |
| 3,674,893 | 7/1972 | Nowak et al. | 260/836 |
| 3,836,600 | 9/1974 | Brewbaker et al. | 260/836 |
| 3,852,376 | 12/1974 | Bando | 525/64 |
| 3,856,883 | 12/1974 | Dickie | 525/64 |
| 3,880,950 | 4/1975 | Hara | 525/64 |
| 3,882,078 | 5/1975 | Kubota | 523/522 |
| 3,887,515 | 6/1975 | Pennington | 523/436 |
| 3,919,353 | 11/1975 | Castelnuovo | 525/69 |
| 3,925,272 | 12/1975 | Ibata | 523/522 |
| 3,947,422 | 3/1976 | Tatum et al. | 260/42.52 |
| 3,992,479 | 11/1976 | Roberts | 525/64 |
| 3,998,909 | 12/1976 | Roberts | 525/64 |
| 4,079,024 | 3/1978 | Hess | 525/64 |
| 4,082,895 | 4/1978 | Backderf | 525/69 |
| 4,096,107 | 6/1978 | Roberts | 525/64 |
| 4,100,224 | 7/1978 | Hess | 525/64 |
| 4,160,759 | 7/1979 | Gardner | 523/522 |
| 4,251,644 | 2/1981 | Joffrion | 525/64 |
| 4,304,698 | 12/1981 | Tachi | 525/64 |
| 4,329,438 | 5/1982 | Yamori | 525/64 |
| 4,336,344 | 6/1982 | Craigie | 525/31 |

FOREIGN PATENT DOCUMENTS 0079227 5/1983 European Pat. Off. ............ 67/06

Primary Examiner—John C. Bleutge
Assistant Examiner—Patricia Short
Attorney, Agent, or Firm—Keil & Weinkauf

[57] ABSTRACT

A hardenable polyester molding material contains a mixture of
I. an ethylenically unsaturated ester or a terminally unsaturated vinyl ester,
II. copolymerizable monomers,
III. 6-25% by weight, based on I+II, or a graft polymer P, in which there are grafted on
  A. 5-95% by weight of an elastomeric polymer,
  B. 95-5% by weight of a polyadduct, polycondensate or acrylic polymer which contains olefinic double bonds, with or without
  C. 0-90% by weight of vinyl monomers, and
IV. 5-300% by weight, based on I+II, of fibrous reinforcing agents.

2 Claims, No Drawings

HARDENABLE POLYESTER MOLDING MATERIALS

This application is a continuation of application Ser. No. 645,798 filed on Aug. 30, 1984, now abandoned.

The present invention relates to hardenable polyester molding materials which contain special graft polymers to increase the toughness. By "hardenable polyesters" there are hereinafter to be understood both unsaturated polyester resins (UP resins) and terminally unsaturated vinyl ester resins (VE resins).

Moldings made from hardened fiber-reinforced polyester resins are brittle especially if the polyester matrix, by virtue of its chemical structure, has high heat distortion resistance. If the molding is subjected to impact, it can cause the matrix to crack even before a distinct damage to the reinforcing fibers is visually discernible. However, matrix damage due to cracking can occur even during hardening if the hardening is effected relatively rapidly in order to achieve short cycle times. Such cracking has the effect that liquids which come into contact with the molding can diffuse into the cracks and damage the fibers.

To improve the toughness and reduce the tendency of polyester moldings to crack under impact, it has at various times been proposed to add rubber to the polyester molding materials. U.S. Pat. No. 3,674,893 proposes adding 5–15% of a low viscosity polydiene rubber to heat-hardening polyester resins. Since rubbers are immiscible with unsaturated polyesters they are usually emulsified, as a styrene solution, in the solutions of the polyester in styrene. However, these emulsions are unstable and show phase separation within a short time, so that handling of these systems is difficult. Accordingly, they have not found acceptance in fields of application in which liquid polyester resins are processed, for example hand lay-up, filament winding or extrusion molding. In fact, due to the poor distribution of the rubber, moldings made from such systems have poor mechanical properties and an irregular surface structure.

The conditions are more advantageous in the case of applications where polyester resins are processed together with a high proportion of fillers and in particular are used in a thickened form, for example in producing sheet-like semi-finished goods (SMC). However, in these cases the rubber phase may migrate to the surface during thickening of the molding material. This then causes increased tackiness of the SMC molding material, produces coatings on the press tool and reveals itself in matt patches on the surface of the molding.

U.S. Pat. No. 3,882,078 describes polyester resins which, as an elasticizing additive, contain a block copolymer of ABA structure, with a long polydiene block B and short polystyrene blocks A. Such resin mixtures are at best stable for a few hours, after which they separate into two phases.

U.S. Pat. No. 3,836,600 therefore proposes improving the compatability of polyester resins and low-profile additives (polydiene rubbers being examples of such additives) by adding stabilizers based on anionically prepared styrene/ethylene oxide or butadiene/ethylene oxide block copolymers. However, the preparation of these block copolymers is difficult and therefore such stabilizers are not used in industrial practice; moreover, the stabilizers adversely affect other properties of the polyester molding materials, for example their chemical resistance. Similar remarks apply to the molding materials according to U.S. Pat. No. 4,336,344, where the compatibility of polyester resins and elastomeric additives is improved by means of esters of diene polymers with carboxyl end groups and polyoxyalkylenes.

U.S. Pat. No. 3,947,422 describes molding materials of vinyl ester resins, a low-profile additive (for example polydiene rubber) and fillers, which compositions contain, as a viscosity-reducing agent, a copolymer of the maleic acid half-ester of a polyethylene glycol of molecular weight 140–6,000 and an alkeny-aromatic monomer. It has been found that polyalkylene copolymers based on such a low molecular weight polyethylene glycol are incapable of adequately improving the stability of emulsions of polydiene rubbers in styrene solutions of polyesters.

EP-A No. 79,227 describes unsaturated polyester resins which are elastomer-modified by addition of low molecular weight reaction products of a butadiene/acrylonitrile copolymer possessing functional groups and an epoxy resin. However, the addition of the said low molecular weight rubbers very greatly reduces the heat distortion resistance of the hardened moldings.

It is an object of the present invention to provide polyester resins which can be hardened to give moldings which possess increased impact strength and do not suffer from the disadvantages described. In particular, the rubber particles should be uniformly and finely dispersed in the polyester matrix so that the moldings have high impact strength, low tendency to form cracks, good mechanical properties and, in addition, a uniform, smooth surface.

A particular object of the invention is to provide low viscosity molding materials of polyester resins and elasticizing rubbers which are stable over a substantial period and may be used to produce filler-free or low-filler glass fiber-reinforced polyester articles.

We have found that this object is achieved if special graft polymers P are employed as rubbers having self-emulsifying properties.

Accordingly, the present invention relates to hardenable polyester molding materials which contain a mixture of I. an ethylenically unsaturated polyester or a terminally unsaturated vinyl ester, II. ethylenically unsaturated monomers copolymerizable with I, III. from 6 to 25% by weight, based on I + II, of a graft polymer P, in which there are grafted, onto A. from 5 to 95% by weight of an elastomeric polymer having a glass transition temperature of below 0° C., B. from 95 to 5% by weight of a polyadduct, polycondensate or acrylic polymer which contains olefinic double bonds and has a glass transition temperature of above 0° C., with or without C. from 0 to 90% by weight of vinyl monomers, the percentages totalling 100, and IV. from 5 to 300% by weight, based on I+II, of fibrous reinforcing agents, with or without V. conventional initiators, polymerization accelerators, inhibitors, lubricants, inert solvents, fillers, thickeners and shrinkage-reducing additives.

The claimed polyester molding materials contain the following constituents:

I. Suitable ethylenically unsaturated polyesters are the conventional polycondensation products of polybasic, especially dibasic, carboxylic acids and their esterifiable derivatives, especially anhydrides, which are linked, through ester bonds, with polyhydric, especially dihydric, alcohols, and which may or may not additionally contain radicals of monobasic carboxylic acids and/or radicals of monohydric alcohols and/or radicals of hydroxycarboxylic acids, at least a proportion of the radicals having to contain ethylenically unsaturated copolymerizable groups.

Suitable polyhydric, especially dihydric, alcohols, which may or may not be unsaturated, are the conventional alkanediols and oxyalkanediols, in particular containing acyclic groups, cyclic groups or both types of groups, e.g. ethylene glycol, propane-1,2-diol, propane-1,3-diol, butane-1,3-diol, butane-1,4-diol, hexane-1,6-diol, 2,2-dimethyloropane-1,3-diol, diethyl glycol, triethylene glycol, polyethylene glycol, dipropylene glycol, cyclohexane-1,2-diol, 2,2-bis-(hydroxycyclohexyl)-propane and trimethylolpropane monoallyl ether. Minor amounts of monohydric, trihydric or polyhydric alcohols, e.g. ethylenehexanol, fatty alcohols, benzyl alcohols, 1,2-di-(allyloxy)-propan-3-ol, glycerol, pentaerythritol or trimethylolpropane may be used together with these.

The polyhydric, in particular dihydric, alcohols are in general reacted in stoichiometric or approximately stoichiometric amounts with polybasic, in particular dibasic, carboxylic acids or their condensable derivatives.

Suitable carboxylic acids and their derivatives are dibasic olefinically unsaturated, preferably $\alpha$, $\beta$-olefinically unsaturated, carboxylic acids, e.g. maleic acid, fumaric acid, chloromaleic acid, itaconic acid, methyleneglutaric acid, mesaconic acid and their esters or, preferably, their anhydrides. Moreover, other modifying dibasic unsaturated and/or saturated as well as aromatic carboxylic acids may additionally be co-condensed in the polyesters, e.g. succinic acid, glutaric acid, methylglutaric acid, adipic acid, sebacic acid, oimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylene-tetrahydrophthalic acid, as may monobasic, tribasic and polybasic carboxylic acids, e.g. ethylhexanoic acid, fatty acids, methacrylic acid, acrylic acid and 1,2,4,5-benzene-tetracarboxylic acid. Maleic acid, its anhydride and fumaric acid are preferred.

Unsaturated polyesters which have been prepared using dicyclopentadiene may also be used advantageously.

Mixed unsaturated polyesters, including those which are only of limited solubility in the vinyl monomers (II) and which crystallize readily can also be employed advantageously. Such readily crystallizing unsaturated polyesters may be synthesized from, for example, fumaric acid, adipic acid, terephthalic acid, ethylene glycol, butane-1,4-diol, hexane-1,6-diol and neopentylglycol.

The unsaturated polyesters have acid numbers of 5–200, preferably 20–85, and mean molecular weights of about 800–6,000, preferably about 1,000–4,000.

The amorphous and potentially crystallizable unsaturated polyesters are in general prepared by continuous or batchwise processes from their starting materials, by melt condensation or condensation under azeotropic conditions.

Suitable terminally unsaturated vinyl ester resins for the purposes of the invention possess the characteristic group —CO—OCH$_2$CHOH—CH$_2$O— and contain terminal polymerizable unsaturated groups. The vinylester resins are prepared by reacting approximately stoichiometric amounts of a polyepoxy resin and an unsaturated monocarboxylic acid, for example methacrylic acid.

Vinyl ester resins of the said type are described, for example, in U.S. Pat. No. 3,367,992, where dicarboxylic acid half-esters of hydroxyacrylates or hydroxymethacrylates are reacted with polyepoxy resins. According to U.S. Pat. Nos. 3,066,112 and 3,179,623 vinyl ester resins are obtained from monocarboxylic acids, e.g. acrylic acid and methacrylic acid; these patents also mention an alternative method of preparation, wherein a glycidyl methacrylate or glycidyl acrylate is reacted with the sodium salt of a dihydric phenol, e.g. bisphenol A. Vinyl ester resins based on epoxy-novolac resins are described in U.S. Pat. No. 3,301,743. U.S. Pat. No. 3,256,226 discloses vinyl ester resins in which the molecular weight of the polyepoxide is increased, before the reaction with acrylic acid, by reacting 2 moles of polyepoxide with 1 mole of a dicarboxylic acid. Modified vinyl ester resins are also suitable, for example those described in German Laid-Open Application DOS No. 2,534,039 (equivalent to U.S. Pat. No. 3,947,422), which contain half-ester groups and are obtained by reacting the second hydroxyl group in the group —CO—OCH$_2$.CHOH—CH$_2$O— with a dicarboxylic acid anhydride, for example maleic anhydride, citraconic anhydride, phthalic anhydride, tetrabromophthalic anhydride etc.

The hardenable polyester molding materials according to the invention in general contain 20–90, preferably 30–80%, by weight of component I, based on the total weight of components I+II.

II. Suitable copolymerizable, ethylenically unsaturated, monomeric compounds are the allyl compounds and, preferably, vinyl compounds, conventionally employed in the preparation of unsaturated polyester molding materials, such as vinyl-aromatics, e.g. styrene, substituted styrenes, e.g. p-chlorostyrene or vinyltoluene, esters of acrylic acid and methacrylic acid with alcohols of 1 to 18 carbon atoms, e.g. methyl methacrylate, butyl acrylate, ethylhexyl acrylate, hydroxypropyl acrylate, dihydrodicyclopentadienyl acrylate and butanediol diacrylate, acrylamide, methacrylamide, allyl esters, e.g. diallyl phthalate, vinyl esters, e.g. vinyl ethylhexanoate, vinyl acetate, vinyl propionate and vinyl pivalate, etc. Mixtures of the said olefinically unsaturated monomers may also be used. Preferred components B are styrene, $\alpha$-methylstyrene, chlorostyrene, vinyltoluene, divinylbenzene and diallyl phthalate. Component II is in general present in the polyester molding materials in an amount of 10–80, preferably 20–70%, by weight based on the total weight of components I+II.

III. The hardenable polyester molding materials according to the invention contain 6–25% by weight, preferably 10–20% by weight, based on I+II, of a self-emulsifying graft polymer P of comb-like structure.

Suitable rubbers (A) for the preparation of the graft polymer P are commercial rubbers as listed, for example, in The Synthetic Rubber Manual, 8th edition, 1980, of the International Institute of Synthetic Rubber Producers Inc., as well as natural rubbers. As categories of compounds there may be mentioned polydiene, polychloroprene, polybutyl, polynitrile and ethylene/$\alpha$-olefin/diene (EPDM) rubbers, as well as random copolymers of dienes and copolymerizable vinyl monomers, e.g. SBR rubber, polyacrylate rubber and ethylene/vinyl ester copolymers. Preferred rubbers are polydienes which may or may not contain functional groups, block polymers which contain polydiene blocks, in particular made up of styrene and/or acrylonitrile blocks and of butadiene and/or isoprene blocks, as well as SBR, EPDM rubbers and polyacrylates. Particularly preferred materials are polybutadiene oils but also high molecular weight polybutadienes and polyisoprenes as well as polyacrylates containing copolymerized dienes and especially butadiene/acrylonitrile block copolymers having terminal functional groups. As a rule rubbers with glass transition temperatures of below 0° C. are used, those with glass transition temperatures below $-10°$ C. being preferred. In the block polymers these figures apply to the particular polydiene blocks.

The molecular weight of suitable rubbers (A) can be varied within wide limits, but excessively high molecular weights lead to correspondingly high solution viscosities and low processing concentrations. Rubbers with molecular weights of 1,000–500,000 are preferred and those with molecular weights of 5,000–300,000 are especially preferred. If more than one rubber is used, these mixtures preferably contain both high molecular weight and low molecular weight rubbers.

The proportion of rubbers (A) depends on the desired degree of elasticization and on the required proportions of starting materials (B) and, where used, (C). The proportion of (A), based on the sum of (A), (B) and, where used, (C), is preferably up to 80, more especially 25–75, and in particular 30–70%, by weight.

Suitable starting materials of group (B) are polymers containing olefinic double bonds, with molecular weights of 1,000–100,000, preferably 2,000–50,000, more especially 2,000–20,000. If the molecular weight of the polymers (B) is too low, the effect in respect of compatibility with the particular polyester resin is as a rule inadequate, while if the molecular weight is above 100,000 it frequently results in very high processing viscosities.

The polymers (B) must possess sufficiently high grafting activity in respect of the vinyl monomers (C). Preferred polymers (B) have a mean content of 0.2–2, especially 0.5–1.3, olefinic double bonds per polymer molecule. The use of polymers having one olefinic double bond per molecule gives best results but is not essential. If the double bond content is too high, undesirable crosslinking may occur. Suitable polymers (B) are in principle all polymers which conform to the above requirements and which can be reacted with the rubbers (A) and, where used, the monomers (C), in a homogeneous or heterogeneous reaction. As a rule it is desirable, though not absolutely essential, that the polymers (B) should be reacted completely. Examples of suitable classes of compounds are polyesters, polyalkylene oxides, polyurethanes, polyetherurethanes, polyester-urethanes, polyether-amides, polyacrylic acid esters, polymethacrylic acid esters and copolymers of these esters with other vinyl monomers, polyolefins, polyvinylaromatics, polyacrylonitrile, polymethacrylonitrile, polysulfones, polyether-sulfones and polyvinyl esters. Polyalkylene oxides, polyesters, polyurethanes and polyvinyl esters are preferred.

Preferred polymers (B) which contain olefinic double bonds can be obtained by reacting saturated polymers with olefinically unsaturated reagents. For example, polymers which contain hydroxyl groups or primary or secondary amino groups can be reacted with olefinically unsaturated carboxylic acids, e.g. acrylic acid, methacrylic acid, maleic acid, fumaric acid or crotonic acid, or their derivatives, e.g. acid halides, anhydrides, esters and half-esters. In certain cases, polymers containing H-acidic groups can also be reacted with olefinically unsaturated epoxides, e.g. glycidyl allyl ether, glycidyl acrylate or glycidyl methacrylate, or with olefinically unsaturated isocyanates. A further possibility is to react polymers containing H-acidic groups with diisocyanates and H-acidic olefinically unsaturated reagents. Polymers possessing carboxyl groups can also be reacted with dienes capable of adduct formation or with olefinically unsaturated alcohols.

It is however also possible to employ olefinically unsaturated reagents directly as a component in the preparation of the polymers, for example to use olefinically unsaturated carboxylic acids in the preparation of polyesters or nylons, or olefinically unsaturated alcohols in the preparation of polyesters, polyethers and polyurethanes. In the ionic polymerization of vinyl-aromatics, acrylonitrile, methacrylonitrile, acrylic acid esters or methacrylic acid esters, olefinically unsaturated reagents, e.g. allyl bromide, glycidyl allyl ether, glycidyl acrylate or glycidyl methacrylate can be used for chain stopping. Further, it is possible to use, in the polymerization, chain stoppers or chain transfer agents which posses reactive groups which can subsequently be reacted with olefinically unsaturated reagents.

The polymers (B) should be compatible with the ethylenically unsaturated polyesters or vinyl esters. In the preparation of SMC prepregs from polyester resins, it is advantageous to use rubber graft polymers containing polyalkylene oxides or polyesters.

The proportion of polymers (B) in the rubber graft polymers depends essentially on what quantity is needed to achieve adequate compatibility with the material. As a rule, less than 5% by weight is insufficient for this purpose. Preferred rubber graft polymers contain 10–60% by weight of poLymers (B), with 15–40% by weight being particularly preferred.

Suitable monomers (B) are in principle all compounds polymerizable by a free radical mechanism and possessing one or more olefinic double bonds, the proportion of polyolefinically unsaturated monomers advantageously being kept, as a rule, below 10% by weight, based on (C), to avoid undesirable crosslinking.

Preferred monomers are those which do not contain any functional groups. They include olefins of 2 to 20 carbon atoms, vinyl-aromatics of 8 to 12 carbon atoms, acrylic acid esters and methacrylic acid esters of straightchain, branched, cycloaliphatic or araliphatic alcohols of 1 to 20 carbon atoms, vinyl esters of carboxylic acids of 1 to 20 carbon atoms, acrylonitrile, methacrylonitrile, vinyl ethers and allyl ethers of 3–20 and 4–20 carbon atoms respectively and maleic or fumaric acid diesters of alcohols of 1 to 20 carbon atoms.

In certain cases it can be advantageous additionally to use monomers (C) which contain functional groups; their proportion should however be less than 30% by weight, based on (C). These monomers include, for example, acrylamide, methacrylamide and their N-alkyl derivatives, N-vinylamides, e.g. N-vinylformamide, N-vinylcaprolactam and N-vinylpyrrolidone, hydroxyl-containing monomers, e.g. hydroxyethyl, hydroxypropyl or hydroxybutyl acrylate or methacrylate, allyl alcohol or allyl ethers of polyfunctional alcohols, olefinically unsaturated carboxylic acids of 3 to 6 carbon atoms, e.g. acrylic acid, methacrylic acid, crotonic acid, maleic acid and fumaric acid, as well as their half-esters, itaconic acid and basic olefinically unsaturated monomers, e.g. N-vinylpyridine and dialkylaminoalkyl acrylates, methacrylates, vinyl ethers or allyl ethers.

Preferred monomers (C) are vinyl-aromatics, especially styrene, methylstyrene or vinyltoluene, as well as acrylic and methacrylic acid esters of alkanols of 1 to 8 carbon atoms, especially ethyl, methyl, n- and i-butyl and 2-ethylhexyl acrylate and methacrylate, and also vinyl acetate and vinyl propionate.

The proportion of monomers (C), based on the sum of (A), (B) and (C), can vary within wide limits, out preferably not less than 1% by weight, and more especially not less than 5% by weight, of monomers (C) is employed. The upper limit of the proportion of the monomers (C) depends essentially on the choice of the proportion of rubber (A) and macromer (B). Preferably, the rubber graft polymers P contain up to 80% by weight, especially from 10 to 60% by weight, of monomers (C).

The novel rubber graft polymers P can be prepared by polymerizing the macromers (B) and, where used, monomers (C) in the presence of the rubber (A), using compounds which decompose into free radicals or using high energy radiation. The polymerization may be carried out in emulsion, suspension or, preferably, solution, or in a non-aqueous dispersion. However, it is also possible to start the polymerization in the presence or absence of an inert solvent and to complete it as an emulsion polymerization or suspension polymerization. Suitable solvents are ketones, e.g. acetone or methyl ethyl ketone, ethers, e.g. tetrahydrofuran and ethylene glycol dialkyl ethers, esters, e.g. ethyl acetate or butyl acetate, alcohols, e.g. ethanol, propanol or butanol, as well as pyridine, dimethylformamide or other conventional solvents. Preferred solvents are hydrocarbons, e.g. aromatics such as toluene or xylene, or aliphatics, such as hexane, cyclohexane and naphthas with boiling ranges of 50-200° C. Particularly preferred solvents are those which have boiling ranges of 50-150° C. and in which the rubbers (A) and macromers (B) are soluble without giving an excessively high viscosity.

In a further preferred embodiment the monomers (C) are used as the solvent and any excess of such solvents is removed by distillation.

As starters it is possible to employ the usual compounds which decompose into free radicals, such as azo compounds, e.g. azoisobutyronitrile, acyl peroxides, e.g. benzoyl peroxide or lauroyl peroxide, alkyl peroxides, e.g. t-butyl peroxide, hydroperoxides, e.g. cumyl hydrooeroxide, peresters, e.g. t-butyl perpivalate, peroctoate, perneodecanoate or perbenzoate and the corresponding t-amyl esters, peracetates, persulfates and hydrogen peroxide. In certain cases the addition of compounds which accelerate the decomposition of the starter (by constituting a redox system) can be useful.

The starters may be employed individually or as a mixture; mixtures of starters of different half-lives are preferred.

IV. Suitable reinforcing fibers are inorganic or organic fibers in the form of rovings or of sheet-like structures which may or may not be woven from the fibers; examples of suitable fibers are glass, carbon, asbestos and cellulose fibers as well as synthetic organic fibers, such as those made from polycarboxylic acid esters, polycarbonates and nylons.

The reinforcing fibers may be used in amounts of 5-300, preferably 10-150% by weight based on components I+II. V. Customary polymerization initiators are peroxides or other organic compounds which thermally decompose into free radicals, the compounds being used in amounts of 0.05-5% by weight, preferably 0.1-3% by weight, based on the total weight of components I+II. Examples of initiators which form free radicals are benzoyl peroxide, tert.-butyl peroctoate, tert.-butyl perbenzoate, cyclohexanone peroxide, tert.-dibutyl peroxide and hydroperoxides, as well as azo compounds, e.g. azodiisobutyronitrile or other organic compounds possessing a labile carbon-carbon bond.

If conventional polymerization accelerators, for example Co, Mn, Sn or Ce salts of organic acids, or amines, such as N,N-dimethylaniline or N,N-diethylaniline, are added to the peroxide-initiated molding materials, the hardening can be carried out even without heating if a hydroperoxide or benzoyl peroxide is used. If conventional photoinitiators, e.g. benzoin ethers, benzil ketals or acyl phosphine compounds, are used, hardening can be effected by irradiation with light of wavelength 200-500 nm.

Conventional inhibitors may be used, e.g. hydroquinone, 2,6-dimethylhydroquinone, tert.-butylpyrocatechol, p-benzoquinone, chloranil, 2,6-dimethylquinone, nitrobenzenes, such as m-dinitrobenzene, thiodiphenylamine, salts of N-nitroso-N-cyclohexylhydroxylamine and mixtures of these. The molding materials in general contain inhibitors in an amount of 0.005-0.2, preferably 0.01-0.1%, by weight based on components I+II.

Suitable inert solvents which may be used where appropriate are ketones, esters and hydrocarbons, these being employed in amounts of up to 100% by weight based on I+II.

Examples of suitable lubricants are zinc stearate, magnesium stearate, calcium stearate and polyalkylene ether waxes.

Examples of suitable fillers are the conventional finely pulverulent or granular inorganic fillers, e.g. chalk, kaolin, quartz powder, dolomite, baryte, metal powders, cement, talc, kieselguhr, wood flour, wood shavings, pigments and the like. These are employed in amounts of 20-200% by weight, based on I+II.

Examples of suitable thickeners are alkaline earth metal oxides, e.g. calcium oxide, calcium hydroxide, magnesium hydroxide and, preferably, magnesium oxide, as well as mixtures of these oxides and/or hydroxides. These may also be partly replaced by zinc oxide. Polyisocyanates are also suitable thickeners in some cases. The thickeners may be added to the molding materials in amounts of 0.5-5% by weight, based on I+II.

Examples of suitable shrinkage-reducing additives which may additionally be used are thermoplastic polymers, e.g. polystyrene, polyvinylacetate, polyacrylates or polymethacrylates, these being employed in amounts of from 1 to about 30% by weight based on components I and II.

The molding materials according to the invention can be processed in liquid or thickened form.

A customary process for the preparation of the molding materials according to the invention is to mix a solution of unsaturated polyester I in monomer II with a solution of graft polymer P in monomer II and emulsify the mixture by vigorous stirring. During the preparation of the emulsion, conventional inhibitors are present in the mixture. Polymerization initiators and accelerators can either be present in the polyester solution or be added to the emulsion. Thereafter, fillers, solvents, thixotropic agents and lubricants may be added to the emulsion where appropriate; the reinforcing fibers E are then impregnated with the liquid resin mixture obtained. The finished molding material can thereafter be processed by various conventional methods, as described, for example, in the monograph by P. H. Selden, Glasfaserverstärkte Kunststoffe, Springer-Verlag 1967, pages 506–615. Moreover, the molding material can also be processed by vacuum forming. The molding materials can be hardened in a conventional manner, for example by hot-hardening at an elevated temperature, cold-hardening by addition of accelerators, or irradiation with ultraviolet light in the presence of added photoinitiators. The moldings obtained are distinguished by good mechanical properties, especially by high impact strength and low tendency to form cracks, as well as by having a uniform, smooth surface.

Thickened molding materials have a high filler content. By adding conventional thickeners, the viscosity of the materials can be increased so greatly that non-tacky but still moldable articles (SMC) are produced, which can then be hardened in a conventional manner. If certain special thermoplastics are added, SMC semifinished goods are obtained, which harden to give low-shrinkage moldings having a smooth surface.

In the Examples, parts and percentages are by weight.

PREPARATION OF THE UNSATURATED POLYESTER RESINS

H1. An unsaturated polyester having an acid number of 31 was prepared by melt condensation of maleic anhydride and 1,2-propylene glycol in a molar ratio of 1:1. A 65% strength solution of the polyester in styrene was then prepared and stabilized with 120 ppm of hydroquinone.

H2. An unsaturated polyester having an acid number of 35 was prepared by melt condensation of maleic anhydride, 1,2-propylene glycol and dipropylene glycol in a molar ratio of 1:0.76:0.33. A 70% strength solution of the polyester in styrene was then prepared and stabilized with 100 ppm of hydroquinone.

H3. An unsaturated vinyl ester was prepared by reacting 1000 g of a bisphenol A diglycidyl ether (Epikote 828 from Shell AG) with 313 g of bisphenol A at 130–140° C. in 1.5 hours and then reacting the product with 472 g of methacrylic acid in the presence of 10 g of dibenzyldimethylammonium chloride and 1 g of hydroquinone monomethyl ether at 120–130° C. in 2–3 hours, to a conversion of 95%.

H4. The procedure followed was as in H3, except that after the reaction with methacrylic acid the resin was stirred with 570 g of maleic anhydride at 90–100° C. for 3–4 hours, giving an unsaturated vinyl ester which contains acid groups and can be thickened.

H5. A novolac-based vinyl ester was prepared by reacting 1000 g of an epoxidized novolac (EPOSID 5038 from Duroplast Chemie) with 430 g of methacrylic acid in the presence of 10 g of dibenzyldimethylammonium chloride and 1 g of hydroquinone monomethyl ether at 90–100° C. After 5–6 hours, 520 g of maleic anhydride were added and the mixture was stirred for 3–4 hours at 90–100° C.

PREPARATION OF THE GRAFT POLYMERS

Prepolymer 1

Using allyl alcohol as the starter and 0.1 part of KOH as the catalyst, a block polyether having a numberaverage molecular weight of 5560 and an average content of 1.0 olefinic double bond per molecule was prepared from 16 parts of propylene oxide and 84 parts of ethylene oxide.

Prepolymer 2

504 parts of a block polyether prepared from 81% of propylene oxide and 19% of ethylene oxide, which had an OH number of 28 and contained 84% of primary hydroxyl groups, were heated with 0.5 part of dibutyltin dilaurate to 50° C. in a round-bottom flask and 15.7 parts of 4,4'-diphenylmethane diisocyanate were added over 15 minutes. Stirring was then continued for 2 hours at 80° C. 160 parts of the polyether-urethane thus obtained were reacted for 0.5–1 hour with 1.3 parts of maleic anhydride and 1.4 parts of succinic anhydride at 120° C. The product had a number-average molecular weight of 6400 and a mean content of olefinic double bonds of 0.5 per molecule.

Prepolymer 3

80 parts of a polyether prepared from 200 moles of ethylene oxide per mole of ethylene glycol were heated with 40 parts of toluene, 0.8 part of maleic anhydride and 0.88 part of succinic anhydride for 1 hour at 120° C. The product had a number-average molecular weight of 8040 and on average contained 0.8 olefinic double bond per molecule.

Rubber graft polymer P 1

300 parts of a butadiene-acrylonitrile copolymer containing 80% of butadiene and having a molecular weight of 2200, 100 parts of prepolymer 1, 100 parts of p-vinyltoluene, 60 parts of methyl methacrylate, 40 parts of acrylic acid and 0.4 parts of Irganox 1076 (antioxidant from Ciba-Geigy) were heated to 60° C. in a flask under nitrogen, 0.4 part of t-butyl perneodecanoate and 0.2 part of lauroyl peroxide were added and the mixture was polymerized for 1 hour 15 minutes at 95–102° C. 0.5 part of formic acid was added, followed 10 minutes later by 0.7 part of hydroquinone monomethyl ether and the batch was cooled, and diluted with 217 parts of styrene during cooling. The product contained 70% of non-volatile material and, according to the NMR spectrum, the polymer contained 17% of polyether structures and 14% of p-vinyltoluene structures, its acid number being 54.

Rubber graft polymer P 2

160 parts of a polybutadiene of molecular weight 300,000 were dissolved in 1760 parts of styrene. 80 parts of prepolymer 3 and 2 parts of Irganox 1076 (an antioxidant from Ciba-Geigy) were added and the mixture was heated to 85° C. At this temperature, 2 parts of t-butyl perpivalate were added over 10 minutes and stirring was continued for 50 minutes. Thereafter, 2 parts of formic acid and 1.6 parts of dimethylquinone were added and the batch was cooled to room temperature. The product obtained contained 25.5% of non-volatile material and had a K value of 78. NMR spectroscopy showed that the polymer contained 31% of polydiene structures, 16% of polyether structures and 53% of polystyrene structures.

Rubber graft polymer P 3

60 parts of Buna AP 451 (an EPDM rubber from Bunawerke Hüls AG), 62 parts of a polybutadiene oil of molecular weight 5400 and 0.93 part of Irganox 1076 were dissolved in 740 parts of α-methylstyrene and the solution was heated to 60° C. Thereafter 61 parts of prepolymer 2 and 0.5 part of benzoyl peroxide were added, and the mixture was heated to 87° C. and stirred for 50 minutes at this temperature. 0.5 part of formic acid was added, followed 10 minutes later by 0.2 part of t-butyl-cresol, and the batch was cooled. A product containing 27.4% of non-volatile constituents and having a K value of 58 was obtained. NMR spectroscopy showed that the product contained 49% of polybutadiene, 24% of polyether and 27% of poly-α-methylstyrene.

Rubber graft polymer P 4

A mixture of 140 parts of Hycar 1300×13 (a butadiene/acrylonitrile rubber, with carboxyl terminal groups, from B.F. Goodrich), 14 parts of prepolymer 4, 0.8 part of Irganox 1076 as the stabilizer and 50 parts of styrene was heated to 60° C., 0.5 part of benzoyl peroxide was added and the batch was heated to 90° C. and kept at this temperature for 1 hour. 0.5 part of formic acid was then added, the mixture was stirred for 10 minutes, 0.2 part of t-butyl-cresol was added and the mixture was adjusted to a solids content of 70% by adding styrene, with cooling. According to the NMR spectrum, the polymer was composed of 74.1% of rubber, 7.4% of polyether and 18.5% of styrene.

Rubber graft polymer P 5

27 parts of a polybutadiene of molecular weight 300,000, 197 parts of styrene, 59 parts of α-methylstyrene and 0.66 part of Irganox 1076 were dissolved at 65° C., 26 parts of a polybutadiene oil of molecular weight 5400 and 25 parts of prepolymer 3 were then added, the mixture was stirred for a further 2 hours, 0.66 part of t-butylperneodecanoate was added and the batch was heated to 88°-92° C. It was stirred for 1 hour at this temperature, 0.16 part of formic acid was added, followed after 10 minutes by 0.25 part of tertiary butyl-cresol, and the batch was cooled.

The product had a solids content of 31%, and the solids were found to comprise 52% of polydiene, 25% of polyether and 23% of polystyrene.

Rubber graft polymer P 6

32.4 parts of a styrene-butadiene-styrene block polymer of molecular weight 180,000, 75.6 parts of styrene and 10.8 parts of prepolymer 3 were polymerized with 0.1 part of t-butyl perpivalate for 4 hours at 85°-89° C. The reaction was then stopped as described for P 4. The product had a solids content of 37%.

Rubber graft polymer P 7

Following a procedure similar to that of Example P 4, 132 parts of a polybutadiene of molecular weight 300,000, 40 parts of prepolymer 3 and 1148 parts of styrene were reacted for 2.7 hours at 85-88° C. 1.65 parts of formic acid were then added, followed 15 minutes later by 3 parts of dimethylquinone, and 279 parts of styrene were distilled off under reduced pressure.

The product had a solids content of 26%, and the solids were found to comprise 50% of polydiene, 35% of polystyrene and 15% of polyether.

Rubber graft polymer P 8

40 parts of a medium-cis-polybutadiene of molecular weight 300,000 were dissolved in 348 parts of styrene at 60° C. 12 parts of prepolymer 3, 0.4 part of Irganox 1076 and 0.4 part of a 50% strength solution of t-butyl peroctoate in naphtha were then added and the mixture was polymerized for 45 minutes at 90-96° C. 0.5 part of formic acid was then added, followed 10 minutes later by 0.3 part of dimethylquinone, and the batch was cooled.

The product had a solids content of 26%, the solid residue having a polystyrene content of 51% and a polyether content of 11%.

Comparative experiment P 9

A graft polymer was prepared similarly to graft polymer P 6, but without prepolymer 3, and using only 90.8 parts of styrene, with a polymerization time of 4.5 hours. A distillation was not carried out. The solids content was 28% and the solid product had a polydiene content of 46% and a polystyrene content of 54%.

EXAMPLE 1

130 parts of a 5-ply glass fiber mat were impregnated with 165 parts of binder (see Table 1) and 165 parts of chalk filler. The binder contained 1.5% of tert.-butyl perbenzoate as the initiator. The laminate was pressed between polyester films in a steel mold to give 4 mm thick sheets (16×16 cm), which were hardened for 20 minutes at 140° C. under 200 bar.

To assess the proneness of the molded materials to crack, test specimens (8×8 cm) were clamped between two metal rings (diameter of exposed area 6 cm), and a steel ball (weight 761 g, diameter 5.7 cm) was allowed to fall thereon from 50 cm height. The underside of the test specimen was sprayed with a red dye solution and after 5 minutes was washed with water and dried. To assess the proneness to cracking, the damaged zone (red, circular core) was cut through the middle and the depth of penetration of the dye was determined by means of a precision magnifying glass. The greater the depth of penetration, the more impact-sensitive and brittle is the molded material.

The results in Table 1 show that the depth of penetration is markedly less in the moldings modified according to the invention (experiments a, b and c) than when using resin H1 alone.

TABLE 1

| Experiment | Unsaturated polyester resin H1 parts | Rubber Type | Parts | Depth of penetration mm |
|---|---|---|---|---|
| a | 165 | — | | 3.9 |
| b* | 100 | P 5 | 65 | 1.6 |
| c | 100 | P 6 | 65 | 2.4 |
| d | 100 | P 7 | 65 | 2.0 |

*The binder additionally contained 16 parts of a 33% strength solution of an acid-modified (acid number 7) polyvinyl acetate in styrene as a low-profile component.

EXAMPLE 2

To test the emulsifiability, 40 parts of rubber solution were mixed thoroughly with 60 parts of unsaturated polyester resin H1 or H2 and the stability of the emulsion was observed. The results in Table 2 show that the emulsions according to the invention are stable over the period of observation of one week, while the emulsion containing rubber solution P 8 (comparative experiment, in which the graft polymer was not modified with component B) separated into two phases within 1 day.

TABLE 2

| Rubber | Unsaturated polyester resin | Emulsion stability |
| --- | --- | --- |
| P 5 | H1 | 1 week |
| P 5 | H2 | 1 week |
| P 8 | H1 | 1 week |
| P 8 | H2 | 1 week |
| P 9 | H1 | 24 hours |
| P 9 | H2 | 24 hours |

EXAMPLE 3

Resins H3 to H5 were mixed with rubber graft polymers P 1 to P 3 and styrene to give the following composition:

60 parts of resin H
15 parts of graft polymer P
40 parts of styrene.

For comparison, mixtures were prepared from 60 parts of resin H
40 parts of styrene.

100 parts of the said mixtures were compounded with 100 parts of calcium carbonate, 2 parts of benzoyl peroxide and—in the case of resins H$_2$ and H$_3$, which could be thickened—2.5 parts of magnesium oxide. Glass mats (5 plies, to give a glass content of 35% in the molded material) were impregnated with this formulation and, either immediately or after 3 days' thickening at room temperature—were pressed and hardened at 120° C. The impact strength of the test sheets was measured by determining the minimum drop height of a steel ball (weight 761 g, diameter 5.7 cm) which produced distinct cracking. The results are shown in Table 3.

TABLE 3

| Mixture | | Drop height in cm |
| --- | --- | --- |
| H3/St | | 20 |
| H4/St | | 15 |
| H5/St | | 15 |
| H3/P | 1/St | 65 |
| H3/P | 2/St | 55 |
| H3/P | 3/St | 60 |
| H3/P | 4/St | 50 |
| H4/P | 1/St | 45 |
| H4/P | 2/St | 40 |
| H4/P | 3/St | 45 |
| H4/P | 4/St | 35 |
| H5/P | 1/St | 50 |
| H5/P | 2/St | 50 |
| H5/P | 3/St | 45 |
| H5/P | 4/St | 40 |

We claim:
1. A hardenable polyester molding material which comprises a mixture of
   I. An ethylenically unsaturated polyester or a terminally unsatuarated vinyl ester,
   II. ethylenically unsaturated monomers copolymerizable with I,
   III. from 6 to 25% by weight, based on I+II, of a graft polymer P, in which there are grafted on
      A. from 5 to 95% by weight of an elastomeric polymer having a glass transition temperature of below 0° C.,
      B. from 95 to 5% by weight of a polyalkylene oxide, having a mean content of 0.2 to 2 olfinic double bonds per polymer molecule, a number-average molecular weight of 1,000–100,000, and has a glass transition temperature of above 0° C., and
      C. from 0 to 90% by weight of vinyl monomers, the percentages totalling 100, and
   IV. from 5 to 300% by weight, based on I+II of fibrous reinforcing agents.
2. The molding material of claim 1, wherein the graft polymer P contains from 10 to 60% by weight of vinyl monomers (C).

* * * * *

UNITED STATES PATENT AND TRADEMARK OFFICE
CERTIFICATE OF CORRECTION

PATENT NO. : 4,670,485
DATED : June 2, 1987
INVENTOR(S) : HESSE et al.

It is certified that error appears in the above-identified patent and that said Letters Patent is hereby corrected as shown below:

In the Abstract, line 6:

[or] a graft polymer should be of a graft polymer

Signed and Sealed this

Twenty-fifth Day of August, 1987

*Attest:*

DONALD J. QUIGG

*Attesting Officer*    *Commissioner of Patents and Trademarks*